United States Patent
Okumura et al.

(10) Patent No.: US 8,160,659 B2
(45) Date of Patent: Apr. 17, 2012

(54) PORTABLE DEVICE INCLUDING A TRANSPARENT COVER USABLE AS AN ELECTROSTATIC CAPACITY SWITCH ELECTRODE AND AN ANTENNA

(75) Inventors: Shuzo Okumura, Kyoto (JP); Ryomei Omote, Kyoto (JP); Takao Hashimoto, Kyoto (JP); Yuki Matsui, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 158 days.

(21) Appl. No.: 12/595,881

(22) PCT Filed: Apr. 9, 2008

(86) PCT No.: PCT/JP2008/056985
§ 371 (c)(1),
(2), (4) Date: Feb. 17, 2010

(87) PCT Pub. No.: WO2008/133005
PCT Pub. Date: Nov. 6, 2008

(65) Prior Publication Data
US 2010/0144407 A1  Jun. 10, 2010

(30) Foreign Application Priority Data
Apr. 16, 2007 (JP) ................................. 2007-106837

(51) Int. Cl.
*H04M 1/00* (2006.01)
(52) U.S. Cl. ................ 455/575.3; 455/575.7; 455/575.8
(58) Field of Classification Search .................. None
See application file for complete search history.

(56) References Cited

U.S. PATENT DOCUMENTS

| | | | |
|---|---|---|---|
| 4,313,119 A | 1/1982 | Garay et al. | |
| 4,644,366 A | 2/1987 | Scholz | |
| 5,014,346 A | 5/1991 | Phillips et al. | |
| 5,649,306 A | 7/1997 | Vannatta et al. | |
| 5,809,433 A | 9/1998 | Thompson et al. | |
| 6,266,538 B1 | 7/2001 | Waldron | |

(Continued)

FOREIGN PATENT DOCUMENTS

EP 0 120 418 10/1984

(Continued)

OTHER PUBLICATIONS

Supplementary European Search Report issued Nov. 24, 2010 in corresponding European Patent Application No. 08 74 0088.

(Continued)

*Primary Examiner* — Erika Gary
(74) *Attorney, Agent, or Firm* — Wenderoth, Lind & Ponack, LLP

(57) ABSTRACT

A portable device including a transparent cover (1) having a light transmittance of not less than 50%. A circuit pattern of a conductive material is provided in the cover between two sheet-like transparent substrates (5a). A device main body (2) is coupled to the transparent cover 1 thereto in an openable/closable manner such that members provided on a surface thereof are concealed or exposed by the transparent cover (1) being opened or closed. An open/close determination part (7) is provided for determining whether the transparent cover is open or closed, and function switching parts (22, 23) are provided for switching functions of the circuit pattern based on the determination of the open/close determination part as to whether the transparent cover is open or closed.

4 Claims, 4 Drawing Sheets

U.S. PATENT DOCUMENTS

| | | |
|---|---|---|
| 6,314,183 B1 | 11/2001 | Pehrsson et al. |
| 6,327,485 B1 * | 12/2001 | Waldron ............... 455/575.3 |
| 6,442,400 B1 * | 8/2002 | Ying et al. ............. 455/552.1 |
| 6,600,450 B1 | 7/2003 | Efanov et al. |
| 7,203,533 B1 | 4/2007 | Tischer |
| 2004/0183788 A1 | 9/2004 | Kurashima et al. |
| 2006/0073844 A1 | 4/2006 | Chan et al. |

FOREIGN PATENT DOCUMENTS

| | | |
|---|---|---|
| EP | 0 911 906 | 4/1999 |
| GB | 2 418 808 | 4/2006 |
| JP | 1-198121 | 8/1989 |
| JP | 4-128440 | 11/1992 |
| JP | 8-102609 | 4/1996 |
| JP | 8-186518 | 7/1996 |
| JP | 11-215022 | 8/1999 |
| JP | 11-317610 | 11/1999 |
| JP | 2000-216611 | 8/2000 |
| JP | 2001-166883 | 6/2001 |
| JP | 2001-523057 | 11/2001 |
| JP | 2002-215330 | 8/2002 |
| JP | 2004-234270 | 8/2004 |
| JP | 2005-528012 | 9/2005 |
| JP | 2006-197645 | 7/2006 |
| WO | 03/021922 | 3/2003 |

OTHER PUBLICATIONS

International Search Report issued Jul. 1, 2008 in International (PCT) Application No. PCT/JP2008/056985.

Patent Cooperation Treaty (PCT) International Preliminary Report on Patentability issued Nov. 19, 2009 in corresponding International Application No. PCT/JP2008/056985.

* cited by examiner

PORTABLE DEVICE INCLUDING A TRANSPARENT COVER USABLE AS AN ELECTROSTATIC CAPACITY SWITCH ELECTRODE AND AN ANTENNA

BACKGROUND OF THE INVENTION

1. Technical Field

The present invention relates to portable devices, such as mobile phones and personal digital assistants (PDAs), including a transparent flip cover that is usable as, e.g., an electrostatic capacity switch electrode and an antenna.

2. Description of the Related Art

Some types of portable devices, such as mobile phones and PDAs, include a transparent flip cover which is opened at use to use the device. The main intended function of the flip cover is, for example, to protect the device main body with operation buttons, a display, and the like. Various demands however have arisen, such as downsizing of portable devices, which give rise to a need to implement functions as, e.g., an input device to the flip cover that has conventionally been used solely for the protection of the device main body.

SUMMARY OF THE INVENTION

Moreover, further downsizing is required for the portable devices.

Accordingly, a technical object of the present invention is to provide a portable device having a transparent cover with a circuit pattern built therein. The portable device is aesthetically pleasing and is capable of providing advanced functions and an even more compact size.

In order to achieve the foregoing technical object, the present invention provides a portable device having the following structure.

According to a first aspect of the present invention, there is provided a portable device comprising: a cover having a light transmittance of not less than 30%. The cover is structured such that a circuit pattern of a translucent conductive material is provided on a surface of a transparent substrate. The cover is coupled to a device main body in an openable and closable manner, and a function switching part is provided for causing the circuit pattern to function as an antenna when the cover is open and to function as an electrostatic capacity switch when the cover is closed, based on an operation of a user.

According to a second aspect of the present invention, the circuit pattern is formed of a mesh pattern that has an outline of meshes made of bands that are very thin and have a substantially equal width, a band width of each of the very thin bands being not greater than 30 μm.

According to a third aspect of the present invention, the portable device further comprises an open/close determination part for determining whether the transparent cover is open or closed. The open/close determination part determining opening or closing of the transparent cover in response to opening or closing operations by the user to activate the function switching part to cause the circuit pattern to function as the antenna when the transparent cover is open and to function as the electrostatic capacity switch when the transparent cover is closed.

According to a fourth aspect of the present invention, the open/close determination part may include: a pin provided on a surface on a side to be contacted by the device main body when the cover is closed onto the device main body; an insertion portion provided in the device main body to receive the pin; and a press switch provided inside the insertion portion.

According to the present invention, since the function switching part is provided to switch functions of the circuit pattern in response to opening and closing of the transparent cover, one transparent cover may be used as two members. In other words, the size of the portable device can hence be reduced.

Further, the circuit pattern employs a mesh pattern in which the outline of each of the meshes is formed by very thin bands that have a substantially equal band width of not greater than 30 μm. Thus, the outlines of the meshes as a whole are almost invisible and are thus perceived as transparent. Since the mesh pattern is invisible, the transparent cover is perceived as transparent as a whole. The band widths of not greater than 30 μm of the meshes render the mesh pattern to be seldom visible to the naked eye, so that the transparency of the transparent cover is improved.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE INVENTION

A portable device according to one embodiment of the present invention is described below with reference to the drawings.

Figure 1A:
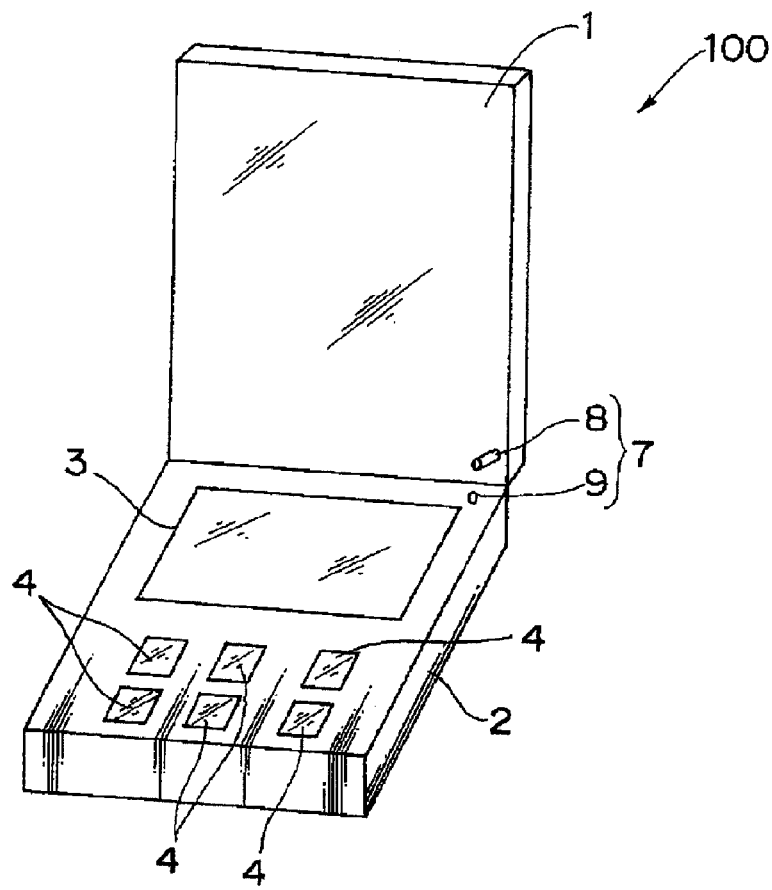
FIG. 1A is a perspective view showing the exterior structure of a portable device terminal with a flip cover in an open state according to an embodiment of the present invention.
Figure 1B:
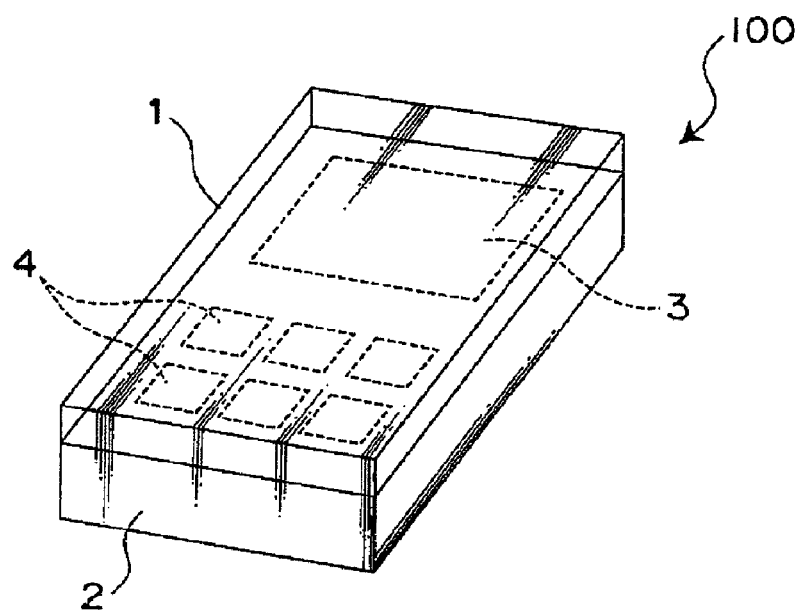
FIG. 1B is a perspective view showing the portable device terminal of FIG. 1A in a state where the flip cover is closed.

FIG. 1A is a perspective view showing the exterior structure of a portable device terminal with a flip cover in an open state according to a first embodiment of the present invention. FIG. 1B is a perspective view showing the portable device terminal of FIG. 1A in a state where the flip cover is closed. The portable device terminal 100 includes a main body 2 having a display 3 and operation buttons 4, as well as the flip cover 1. The flip cover is hingedly coupled to the main body 2 in an openable/closable manner and, when closed, functions as a protective cover for the display 3 and the operation buttons 4 on a surface of the main body and also as an electrostatic capacity switch. As shown in FIG. 1, when opened, the flip cover is swung upward relative to the main body to function as an antenna by means of a conductive circuit pattern built therein.

The portable terminal 100 includes an open/close determination part 7 for determining whether the flip cover 1 is opened or closed. In the present embodiment, a pin 8 is provided on a surface to be contacted by the portable device when the flip cover is closed, i.e., an inner surface of the flip cover. An insertion portion 9 is also provided such that the pin 8 is inserted therein when the flip cover is closed. A switch 24 (see FIG. 6) is provided on the inner portion of the insertion portion 9 in such a manner that the switch is pressed by the pin 8 when the flip cover is closed, thereby to enable determination that the flip cover is closed. Note that the open/close determination part 7 is not limited to this configuration insofar as the open/close determination part is capable of reliably determining whether the flip cover is opened or closed.

Figure 2:
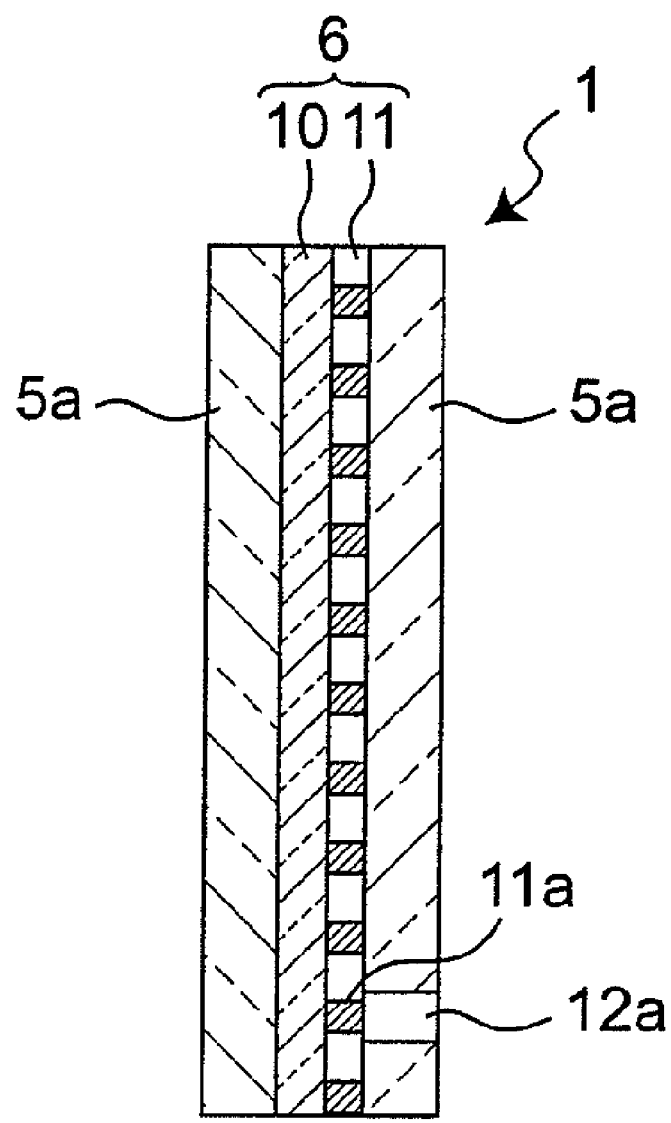
FIG. 2 is a cross-sectional view of the flip cover of the portable device of FIG. 1A.

FIG. 2 is a cross-sectional view of the flip cover of the portable device of FIG. 1A. As shown in FIG. 2, the flip cover 1 is provided in the form of a transparent flat plate. The flip cover 1 has a structure in which transparent substrates 5a sandwich a transparent plastic sheet 6 including a transparent substrate sheet 10 and a mesh circuit pattern 11 applied on a surface of the sheet 10. One of the transparent substrates 5a is provided with a feed through hole 12a. The feed through hole 12a is provided to extend in the thickness direction of the transparent substrate 5a, so as to expose a feeding part 11a in the circuit pattern 11 provided on the surface of the transparent plastic sheet 6. The through hole may be provided at two positions in the case of using a circuit pattern 11 including feeding portions at two positions.

In view of the purpose of feeding power to the flip cover, the feed through hole 12a is preferably concealed with the main body 2 so as not to be exposed externally when the flip cover is fitted to the main body 2.

The transparent substrates 5a may use transparent resins such as polycarbonate, acrylic resin, polyethylene terephthalate, or triacetylcellulose. At least one of the transparent substrates may use transparent glass in a sheet-like shape. The transparent substrate using transparent glass is preferably provided at the side where the feed through hole 12a is not provided.

The circuit pattern 11 is made of a thin film of an electroconductive material, and is a layer having a light transmittance of 30% or more, wherein the outline of its meshes is made of bands that are very thin and have a substantially equal width. Since the circuit pattern 11 is made of the very thin bands, the mesh pattern of the mesh layer 11 can be perceived when the circuit pattern is viewed from a position near the circuit pattern. However, the circuit pattern appears to be transparent as a whole in a case where the circuit pattern is viewed apart therefrom when the portable terminal is used.

The feeding part 11a for the antenna and the electrostatic capacity switch on a portion of the circuit pattern 11 is exposed externally by the feed through hole 12a in the transparent substrate. In fitting the flip cover 1 to the main body 2, electrodes on the side of the main body 2 are inserted in the feed through hole 12a, so that an electrical connection is established between the circuit pattern 11 and the main body 2 of the portable terminal 100.

The circuit pattern 11 disposed in the transparent plastic sheet 6 is not particularly limited given that the circuit pattern is formed of a conductive material that is capable of providing a function as the antenna or the electrostatic capacity switch. The conductive raw material may be metals including, e.g., gold, platinum, silver, copper, aluminum, nickel, zinc, lead, and iron. A conductive high-molecular compound, such as a conductive polymer, may also be used. The circuit patterns of these materials may be formed on a surface of the substrate film 15 by means of, e.g., foil, pasting, or plating.

Figure 3:
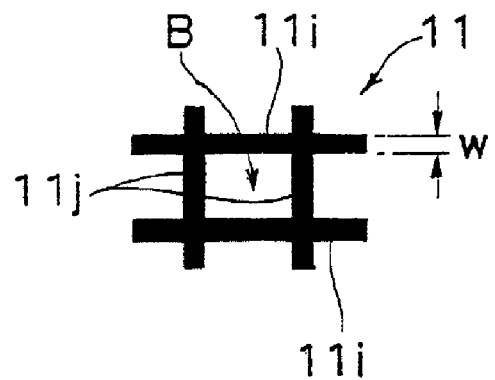
FIG. 3 is an enlarged view showing a basic pattern of a mesh shape of very thin bands constituting a circuit pattern.
Figure 4:
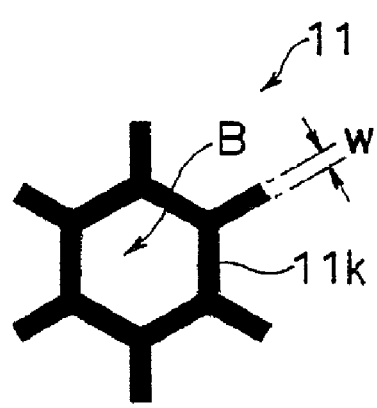
FIG. 4 is an enlarged view showing a modification of the mesh shape of very thin bands.
Figure 5:
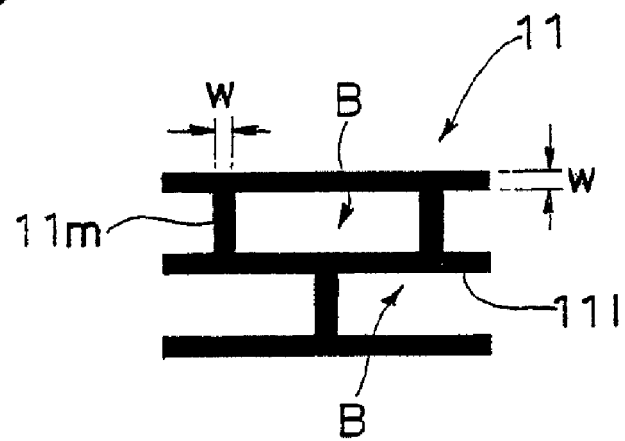
FIG. 5 is an enlarged view showing a further modification of the mesh shape of very thin bands.

FIGS. 3 to 5 are enlarged views of mesh structures of the circuit pattern 11. The mesh structure shown in FIG. 3 is formed in a grid-like mesh by using linear, very thin bands extending in directions orthogonal to each other such that a light transmittance of not less than 70% is ensured for use as a circuit pattern. The light transmittance is measured by use of a spectrometer (model number: NDH2000) manufactured by Nippon Denshoku Industries Co., Ltd. Note that the measurement is conducted with the light transmittance in the air layer represented as 100%. Low reflection treatment may be performed on the surface of the circuit pattern 11, in which case the light transmittance is measured in a condition where a low reflection-treated layer is provided.

The band width w of each of the bands, which are very thin bands 11i and 11j forming the outline of rectangles, is made into the same width of 30 μm or less. The meshes of the circuit pattern 11 stand out with band widths w greater than 30 μm, which causes deterioration in design of the flip cover 1 due to the visibility of the circuit pattern. In other words, a band width w of not greater than 30 μm enables fabrication of a flip cover of which the existence of the circuit pattern 11 is hardly recognized. When the film thickness of the circuit pattern 11 is set in such a manner that the ratio of the band width to the film thickness becomes 0.5 or more, the performance of the circuit pattern can certainly be maintained with ease when the circuit pattern is used as the antenna or the electrostatic capacity switch.

The mesh structure of a circuit pattern shown in FIG. 4 has a mesh shape having a honeycomb structure formed of uninterruptedly linked hexagonal meshes. Very thin bands 11k forming the outlines of the hexagons preferably have band widths of not greater than 30 μm.

The mesh structure of a circuit pattern shown in FIG. 5 is a structure wherein ladder-forms as nuclei are continued to each other in two directions so as to be made into a mesh form. The band width of very thin bands 11l and 11m, which become the outline of the ladder-forms, is preferably 30 μm or less.

Regarding the light transmittance of each of the circuit patterns 11 having the above-described structures, a light transmittance of not less than 30% is reliably achieved by selecting a combination of a band width of the very thin bands 11i, 11j, 11k, 11l, and 11m and a size of the openings B formed by being surrounded by these very thin bands.

Besides the mesh forms illustrated in FIGS. 3 to 5, given are a mesh form that rectangles as nuclei are continued to each other, a mesh form that polygons as nuclei are continued to each other, and a mesh form that ladder-forms as nuclei are continued to each other. Of these mesh forms, a mesh form that squares as nuclei are continued to each other is preferred since the mesh pattern thereof is less recognized to be in a stripe form than that of a mesh form that nuclei in any other polygonal form are continued to each other. Specifically, when a pattern in which nuclei having some shape are regularly continued to each other is viewed, the outline thereof tends to appear to be in the form of continuous stripes along the direction in which the nuclei (openings B) are continued. In the case of, for example, a pattern wherein hexagons are nuclei, the lines of the very thin bands along the direction in which the hexagons are continued become zigzag. Thus, the very thin bands appear to be thicker by the amplitude of the zigzags. As a result, the very thin bands appear to be swelled. However, in the case where squares as nuclei are continued to each other, the very thin bands along the continuous direction become straight. Thus, it is not feared that the width of the very thin bands appears to be larger than the original width. As described above, the very thin bands are 30 μm or less in width, and very thin; therefore, the existence thereof is not easily recognized, and the meshes in the mesh layer are inconspicuous.

In a pattern wherein rectangles as nuclei are continued to each other, the pitch in the long side direction of the rectangles and that in the short side direction thereof are different from each other. Therefore, when the whole is viewed, the pattern appears to be denser in the short side direction, along which the pitch is shorter, than in the long side direction. This turns into the form of stripes so that the stripes appear to flicker. However, in the pattern wherein squares as nuclei are continued to each other, such a stripe form does not make its appearance so that the pattern becomes inconspicuous.

The functions of the circuit pattern 11 are executed when the flip cover is in use as the antenna and as the electrostatic capacity switch as described above. More specifically, as shown in FIG. 1A, the flip cover is positioned higher relative to the main body 2 in a state where the flip cover is opened, so that the flip cover can be used as the antenna. On the other hand, when closed, the flip cover 1 is positioned so as to cover the display 3 and the operation buttons 4 on the main body 2. Thus, use as the electrostatic capacity switch is enabled by touching on the surface at a particular position of the flip cover based on the indication of the display 3 and the operation buttons 4 at the lower side of the flip cover.

Figure 6:
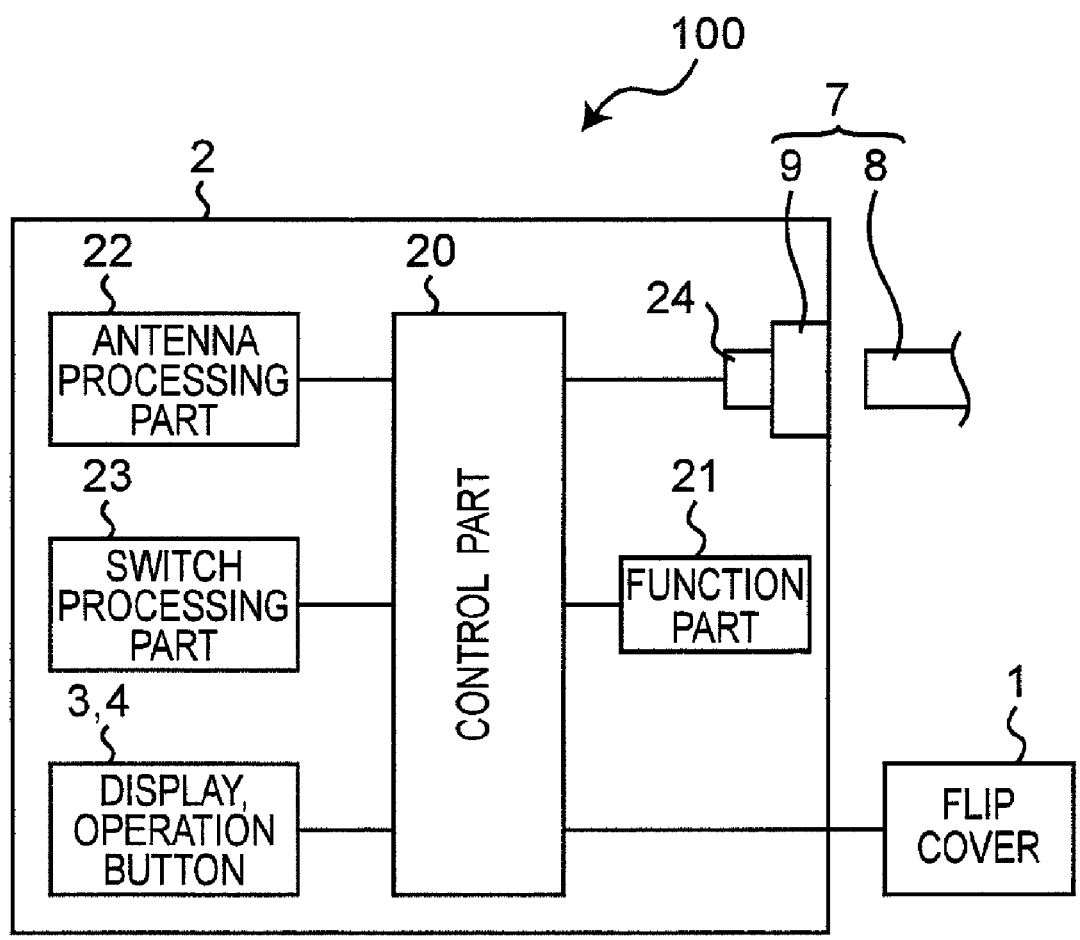
FIG. 6 is a block diagram showing functional blocks of a main body.

Whether the circuit pattern 11 in the flip cover 1 is used as the antenna or the electrostatic capacity switch depends on the processing of software in the main body 2. FIG. 6 is a block diagram showing functional blocks of the main body.

As shown in FIG. 6, the main body 2 of the portable device 100 is provided with a control part 20 and a function part 21 as functional blocks for executing various functions of the portable device. The function part 21 is a functional block for executing the various functions conducted by the portable device 100. The control part 20 actuates the function part 21 based on input signals from the operation buttons 4 and the like. A description is provided below of how the use of the circuit pattern 11 in the flip cover is switched between the antenna and the electrostatic capacity switch.

As described above, the flip cover 1 is provided with the pin 8 constituting the open/close determination part 7, whilst the main body 2 is provided with the insertion hole 9. The switch 24 is provided on the inner portion of the insertion hole 9, and closing and opening of the flip cover 1 cause the switch 24 to be turned on and off in response to the pin 8 having been pressed or not. The information on the on-off switching of the switch is transmitted to the control part 20. The control part 20 decides whether the circuit pattern 11 in the flip cover 1 is used as the antenna or as the electrostatic capacity switch based on the information from the switch and causes the function part 21 to execute processing according to each function.

An antenna processing part 22 and a switch processing part 23 perform processing for adapting the circuit pattern in the flip cover to the function decided, based on the decision of the control part 20. Specifically, these parts are responsible for the processing of voltages to be applied to the circuit pattern 11, signals received from the circuit pattern, and the like.

With the portable device according to the present embodiment as described above, since the use of the circuit pattern 11 provided inside the flip cover can be switched between the antenna and the electrostatic capacity switch in response to opening and closing of the flip cover 1 for use, the portable device can be made multifunctional and compact in size. As the flip cover 1 is transparent, a sophisticated design of the portable device is obtained. And besides, in the use as the electrostatic capacity switch, specification of input positions is possible by making use of the indication on the display 3 and the operation buttons 4 provided on the surface of the device main body.

The present invention is not limited to the foregoing embodiment and may be implemented in various other aspects.

For example, while the circuit pattern is formed of the mesh pattern in the foregoing embodiment, transparent electrodes may also be used for the formation. Materials of the transparent electrodes include, e.g., a translucent conductive polymer.

It is also possible that a human conducts operation for switching functions directly without using the open/close determination part, e.g., by the user pressing on an operation button 4 on the device main body for activation of the switch 24. In this case, the operation may take place immediately before opening/closing of the flip cover, or may take place after the opening/closing.

Moreover, while the flip cover is structured to sandwich the circuit pattern with the transparent substrates in the foregoing embodiment, for example, the flip cover may be structured such that the circuit pattern is applied to a surface of a transparent substrate.

By properly combining arbitrary embodiments of the aforementioned various embodiments, the effects owned by each of them can be made effectual.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A portable device by comprising:
    a device main body;
    a cover coupled to the device main body in an openable and closable manner, the cover having a light transmittance of at least 30%,
    the cover comprising a transparent substrate and a circuit pattern formed of a translucent conductive material provided on a surface of a the transparent substrate; and
    a function switching part for causing the circuit pattern to function as an antenna when the cover is open and to function as an electrostatic capacity switch, without functioning as an antenna, when the cover is closed, based on an operation of a user.

2. The portable device according to claim 1, wherein the circuit pattern is formed of a mesh pattern that has an outline of meshes made of bands that have a substantially equal width, and a band width of each of the very thin bands being not greater than 30 μm.

3. The portable device according to claim 1, further comprising an open/close determination part for determining whether the cover is open or closed, the open/close determination part determining opening or closing of the cover in response to an opening or closing operation by the user to activate the function switching part to cause the circuit pattern to function as the antenna when the cover is open and to function as the electrostatic capacity switch when the cover is closed.

4. The portable device according to claim 3, wherein the open/close determination part includes:
    a pin provided on a side of the cover to be contacted by the device main body when the cover is closed onto the device main body;
    an insertion portion provided in the device main body to receive the pin; and
    a press switch provided inside the insertion portion.

* * * * *